United States Patent [19]
Gregory, Jr. et al.

[11] Patent Number: 5,910,611
[45] Date of Patent: Jun. 8, 1999

[54] AQUEOUS ALKANOLAMINES USING AN ELECTRODIALYSIS CELL WITH AN ION EXCHANGE MEMBRANE

[75] Inventors: Richard Alan Gregory, Jr., Belle Mead, N.J.; Martin Frank Cohen, Yorktown Heights, N.Y.

[73] Assignee: Union Carbide Chemicals & Plastics Technology Corporation, Danbury, Conn.

[21] Appl. No.: 08/449,254

[22] Filed: May 24, 1995

Related U.S. Application Data

[63] Continuation of application No. 08/079,708, Jun. 18, 1993, abandoned, which is a continuation of application No. 07/588,939, Sep. 27, 1990, abandoned, which is a continuation of application No. 07/401,865, Sep. 1, 1989, abandoned, which is a continuation of application No. 07/036,486, Apr. 9, 1987, abandoned.

[51] Int. Cl.$^6$ ........................ C07C 209/84; C07C 209/86
[52] U.S. Cl. ............................................................ 564/497
[58] Field of Search ............................................. 564/497

[56] References Cited

U.S. PATENT DOCUMENTS

| | | | |
|---|---|---|---|
| 2,797,188 | 6/1957 | Taylor, Jr. et al. | 208/236 |
| 3,291,713 | 12/1966 | Parsi | 204/180 |
| 3,554,691 | 1/1971 | Kuo et al. | 423/229 |
| 3,620,674 | 11/1971 | Renault et al. | 423/243 |
| 3,664,930 | 5/1972 | Pottiez et al. | 203/37 |
| 3,904,735 | 9/1975 | Atwood et al. | 423/243 |
| 4,051,002 | 9/1977 | Gunjima et al. | 204/180 P |
| 4,071,602 | 1/1978 | Pearce | 423/243 |
| 4,107,015 | 8/1978 | Chlanda et al. | 204/182.4 |
| 4,113,849 | 9/1978 | Atwood | 423/242 |
| 4,122,149 | 10/1978 | Dunnery et al. | 423/242 |
| 4,170,628 | 10/1979 | Kosseim et al. | 423/243 |
| 4,184,855 | 1/1980 | Butwell et al. | 423/229 |
| 4,389,383 | 6/1983 | Sokolik, Jr. et al. | 423/243 |
| 4,471,138 | 9/1984 | Stogryn | 564/508 |
| 4,704,463 | 11/1987 | Blytas | 549/541 |

FOREIGN PATENT DOCUMENTS

| | | |
|---|---|---|
| 3446695 | 6/1986 | Germany . |
| 124873 | of 1977 | Japan . |
| 009124 | of 1981 | Japan . |

OTHER PUBLICATIONS

Kohl & Riesenfeld, Gas Purification, published by McGraw–Hill Co., 1960, pp. 78–63.

R.J. Blake, Oil & Gas J., 61, (1963, No. 36) 134, col. 1, line 69 to col. 2, line 2.

Zabolotskii et al., Zh. Prikl, Khim. (leningrad), 55(5), 1105–10, (1982).

Chemical Abstracts, vol. 104, No. 2, Jan. 13, 1986, p. 342, Abstract No. 10918K; Zabolotskii et al., "Regeneration of Monoethanolamine–based Sorbents of Carbon Dioxi by Electrodialysis with Bipolar Membranes"; Zhurnal Prikladnoi Khimii, vol. 58, No. 10, pp. 2396–2399, Oct., 1985 (English Translation).

*Primary Examiner*—Ba K. Trinh
*Attorney, Agent, or Firm*—G. T. Hampilos

[57] ABSTRACT

Method which includes passing a gas stream containing carbon dioxide, hydrogen sulfide, sulfur dioxide, mercaptans and other acid gases through an aqueous alkanolamine solution to remove the carbon dioxide, hydrogen sulfide, sulfur dioxide, mercaptans, etc., from the gaseous stream. Heat-stable alkanolamine salts form in the aqueous alkanolamine solution due to the acid contaminants (other than hydrogen sulfide or carbon dioxide) removed from the gas stream. A base is added to the aqueous alkanolamine solution to convert all or part of the heat-stable alkanolamine salts into alkanolamine and simple salts. The base-treated aqueous alkanolamine solution is electrodialyzed in an electrodialysis cell containing ion exchange membranes. The purified aqueous alkanolamine solution can be used again to remove carbon dioxide, etc., from the gas stream.

21 Claims, 4 Drawing Sheets

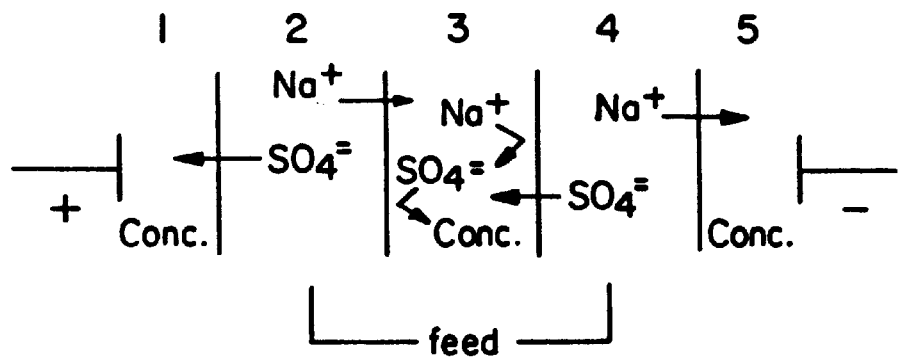
F I G. 3
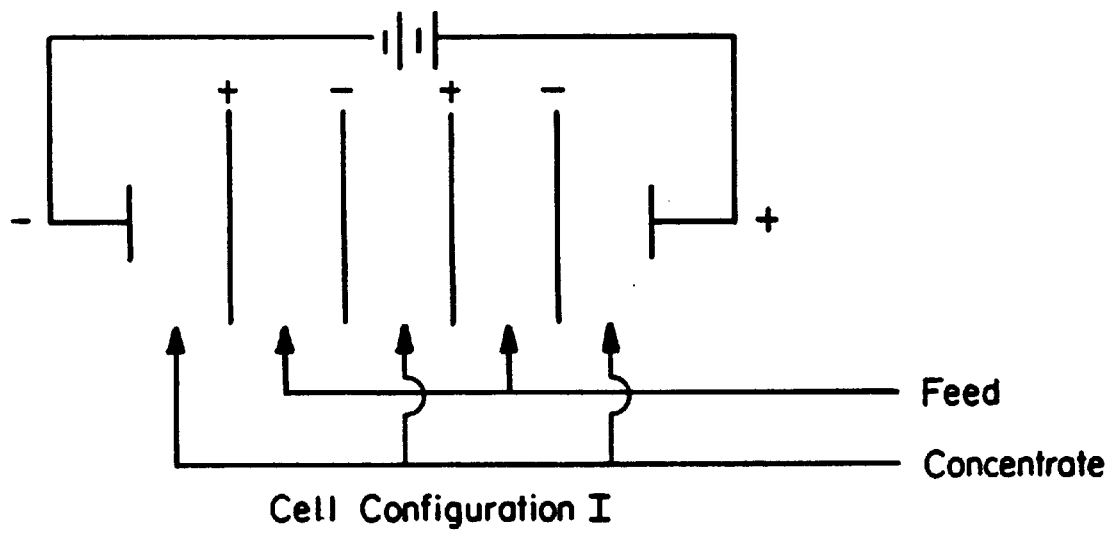
Cell Configuration I
F I G. 4

AQUEOUS ALKANOLAMINES USING AN ELECTRODIALYSIS CELL WITH AN ION EXCHANGE MEMBRANE

This application is a continuation of prior U.S. application Ser. No. 08/079,708 Filing Date Jun. 18, 1993 now abandoned and/which is a continuation of application Ser. No. 07/588,939 Filing Date Sep. 27, 1990 now abandoned and/which is a continuation of application Ser. No. 07/401,865 Filing Date Sep. 1, 1989 now abandoned and/which is a continuation of application Ser. No. 07/036,486 Filing Date Apr. 9, 1987 now abandoned.

BRIEF SUMMARY OF THE INVENTION

A. Technical Field

The invention relates to processes for the removal of heat-stable alkanolamine salts and/or simple salts from aqueous solutions of alkanolamines.

B. Background Art

Aqueous solutions of alkanolamines are used as gas treating solvents to remove $CO_2$, $H_2S$, mercaptans and other acid gases from various industrial gas streams. During use the alkanolamine solutions become contaminated with various salts, such as, sulfates, thiosulfates, chlorides, formates, acetates, oxalates, glycolates, etc. The contaminants can form heat-stable alkanolamine salts by reaction with the alkanolamine. The salts are heat-stable in the sense that the alkanolamine cannot be regenerated by the application of heat within the normal temperature range of the stripping process. At concentrations above about 5 weight percent, the salts can tie up sufficient alkanolamine to significantly reduce the removal efficiency thereof of the acid gases. The salts are also associated with increased corrosion of process equipment as well as fouling and plugging of the process streams and apparatus.

The contaminants which react with the alkanolamine to form the heat-stable alkanolamine salts can be present in the feed gas stream in trace amounts. In this case, the heat-stable alkanolamine salts may slowly increase with time (over several months) to the point where corrective action is required. In some gas treating processes, the contamination can occur within a few hours as a result of an unplanned upset in an upstream unit. For example, in a tail gas treating unit, the upstream converter can malfunction and allow a large slug of sulfur dioxide to break through into the alkanolamine absorber where heat-stable alkanolamine salts are formed.

Typical acid gas treating operations are described in U.S. Pat. No. 4,471,138 (col. 1, lines 21 to 68, col. 2, lines 1 to 61, col. 7, lines 59 to 68, col. 8, and col. 9, lines 1 to 25) and U.S. Pat. No. 4,184,855 (col. 2, lines 42 to 68, col. 3, lines 1 to 56, col. 4, lines 13 to 68, and col. 5, lines 1 to 56).

Similar heat-stable alkanolamine salts are formed where a chemical species, such as $SO_2$ or HCN, in a gas stream is contacted with an alkanolamine absorbent in order to purify the gas stream and/or concentrate the species. For example, in a flue gas application, $SO_2$ needs to be removed from the exhaust gas before it is discharged to the atmosphere. Alkanolamines could be an effective absorbent for this purpose. However, regeneration of the heat-stable alkanolamine salts formed is difficult.

A typical flue gas purification process is described in U.S. Pat. No. 3,554,691 (col. 1, lines 20 to 53 and 67 to 72, col. 2, lines 64 to 73 and col. 3, lines 1 to 29). The patent discloses using an electrodialysis cell with ion exchange resin packed into the spaces between the membranes of the cell. The ion exchange resin is added mainly to reduce the electrical resistivity of the feed solutions (particularly alkanolamines). The primary goal is to replace the traditional stripping columns with electrodialysis for the removal of $CO_2$ and $H_2S$ from the alkanolamine. The salts formed in the patent by the reaction of the acid gases $CO_2$ and $H_2S$ with alkanolamines are not heat-stable salts. The patent makes brief reference to heat-stable alkanolamine salts (col. 1, lines 66 to 72, col. 2, lines 1 to 3, and col. 10, lines 67 to 69). However, there is no example in the patent with heat-stable alkanolamine salts.

The problem faced by the art is to find an efficient, cost-effective means for the regeneration of the alkanolamine as an active absorbent and the removal of excessive concentrations of salts from the aqueous alkanolamine solutions. The heat-stable alkanolamine salts are reaction products of the alkanolamine and various acid contaminants (other than $CO_2$ or $H_2S$). Other inorganic salts can also contaminate alkanolamine absorption systems, for example, by the accidental introduction of brine in the make-up water system.

The most common attempted correction for the problem is to neutralize the heat-stable alkanolamine salts with a base, such as, caustic or sodium carbonate. This frees the alkanolamine for use as an absorbent but the resultant inorganic salts remain in the solution. In general, inorganic salts have a limited solubility in aqueous alkanolamine solutions dependent upon the water concentration and temperature. Local salt precipitation within the process can cause severe corrosion and fouling problems. Simple filtration of solid salts at one point in the process will not necessarily prevent these problems since operating conditions vary at different points in the process. The more desirable action is the removal of the salts to low levels in the aqueous alkanolamine solutions.

Another proposed solution to the problem is the removal of salts using ion exchange resins, either with or without pre-neutralization of the solution with a base. See U.S. Pat. Nos. 4,170,628, 4,122,149, 4,113,849 and 4,071,602. These patents use beds of ion exchange resins to remove heat stable salts formed by the reaction/absorption of $SO_2$ with alkanolamines. The regenerated alkanolamine is recycled for further use as an absorbent.

The solution generally used when salt concentration becomes excessive is a combination of pre-neutralization followed by distillation. Vacuum distillation (or the equivalent approach of stripping with an inert gas) is required to recover the higher boiling alkanolamines which are used in the high performance gas treating solvents. An intermediate step of filtration or centrifugation can also be used (see U.S. Pat. No. 4,389,383). This too is a high cost option. For existing gas treating units, the process must be shut down, the solvent removed and transported to a treatment facility. All of the recovered final alkanolamine product must be vaporized and then condensed, which has the requirement of high energy per pound of recovered solvent.

U.S. Pat. No. 4,389,383 discloses using a regeneration scheme of neutralization, crystallization and vacuum distillation to regenerate alkanolamines formed by the reaction/absorption with sulfur dioxide.

U.S. Pat. No. 4,051,002 discloses a process using electrodialysis to produce a concentrated aqueous base, as opposed to removing inorganic salts and organic salts from an alkanolamine. The specific focus is on producing alkali metal hydroxide from aqueous alkali metal chloride solutions. Ethanolamines are mentioned as a possible feed.

U.S. Pat. No. 4,071,602 discloses a process for the selective removal of $SO_2$ with alkanolamines and regeneration of the alkanolamine using a weak base ion exchange resin. The salt formed between the $SO_2$ and alkanolamine falls into the general heat-stable alkanolamine salt category. No electrodialysis is involved in the patent process.

U.S. Pat. No. 3,664,930 discloses a process for the separation of dialkanolamines from heat-stable salts. The process combines distillation, caustic addition to neutralize the salts and phase separation. The amount of water added to the process is critical to obtaining the required phase separation. The main heat-stable salts of concern here are oxazolidenes which are only significant for mono- and dialkanolamines.

Tertiary alkanolamines form relatively small amounts of this type of salt. The patent states:

"For this reason, it has already been proposed to decompose the salts of alkanolamines by the addition of a strong base, such as sodium hydroxide or sodium carbonate (see KOHL & RIESENFELD, Gas Purification, pub. McGraw-Hill Co., 1960, p. 78–83) and there is also known an analytical procedure for determining exactly the equivalent quantity of Sodium hydroxide necessary for the reactivation of the combined alkanolamine (see R. J. BLAKE, Oil & Gas J., 61, (1963, No. 36). 134)." [Col. 1, line 69, to col. 2, line 2]

Heat-stable salts having sulfur-containing anions (e.g., thiosulfate) are disclosed in U.S. Pat. No. 4,113,849.

Japanese Published Patent Document No. 009124/81 discloses a method of treating flue gas containing nitrogen oxides by scrubbing with a dialkanol amine or trialkanolamine solution also containing ferrous ions, sulfite ions and polyalkanol amine. Regeneration achieved by electrolysis.

Japanese Published Patent Document No. 124873/77 discloses scrubbing combustion gases with a solution $Fe_2^+$, $SO_3^=$ and/or $HSO_3^-$, and polyalkanolamine.

Zabolotskii et al. Zh. Prikl. Khim. (Leningrad), 55(5), 1105–10, (1982), deals with the electrodialysis concentration of carbon dioxide using alkanolamines as solvents. The aqueous solutions contain triethanolamines and polyethylene polyamine.

German Published Patent Document No. 3,446,695 discloses concentrating aqueous solutions or organic compounds containing salts by electrodialysis. This salt content is simultaneously reduced.

U.S. Pat. No. 3,620,674 discloses a two-stage process for regenerating volatile bases and weak volatile acids from their salts.

U.S. Pat. No. 3,904,735 discloses a method for selectively scrubbing $So_2$ and mixtures of $SO_2$ and $SO_3$ from effluent gases using aqueous trialkanolamines or tetrahydroxyalkyl alkylene diamines or the corresponding amine and diamine sulfites as the absorbent solvent composition.

U.S. Pat. No. 2,797,188, in its prior art section, disclosed that inactivated alkanolamine can sometimes be restored by treatment thereof with an excess of strong inorganic alkali such as sodium hydroxide and separation of the alkanolamine by distillation or extraction. The patent asserts that such process has several disadvantages. The patent uses an anion exchange resin. The patent states: "The heating process causes a thermal dissociation of the alkanol amine salts of the absorbed acids to a degree dependent in part on the strength of the particular acid." [Col. 3, lines 69 to 72]

B. Disclosure of the Invention

The invention involves a method for purifying aqueous alkanolamine solutions which have been used to remove carbon dioxide, hydrogen sulfide and other acid gases from gas streams. During gas treatment, the aqueous alkanolamine solutions become contaminated with various inorganic salts, such as, sulfate, and heat-stable alkanolamine salts formed with the alkanolamine itself. These ionic species are selectively removed by passing the aqueous solution through an electrodialysis cell.

Restated, the invention involves a method for removing at least one heat-stable salt of at least one alkanolamine from a contaminated alkanolamine(s) solution. The contaminated alkanolamine solution is treated with a base, preferably an inorganic base. Depending upon the amount of base used, this base treatment converts all or part of the heat-stable alkanolamine salt into alkanolamine and at least one simple salt (which is not a heat-stable alkanolamine salt). Preferably enough base is added to substantially neutralize the heat-stable alkanolamine salts. All of the base can be added at once before the electrodialysis step; or the base can be added continuously or incrementally or intermittently during the electrodialysis step. The base-treated aqueous alkanolamine is then preferably filtered to remove any precipitated salts (due to the base addition) so as not to clog the membranes in the subsequent electrodialysis step. The aqueous alkanolamine solution is then electrodialyzed in an electrodialysis cell containing at least one ion exchange membrane to remove at least one simple salt from the aqueous alkanolamine salt. The electrodialysis cell should have at least one anionic ion exchange membrane and at least one cationic ion exchange membrane. Preferably the electrodialysis cell has two sets of alternating anionic and cationic ion exchange membranes. In this manner essentially purified, free alkanolamine in aqueous solution form is obtained. The regenerated aqueous alkanolamine solution can be used again to remove acid gases from a gas stream.

The heat-stable alkanolamine salts are formed from $SO_2$ and other acid contaminants (except for $CO_2$ and $H_2S$). The simple salts have a cation which is a metal, preferably an alkali metal, and an anion which can be inorganic or organic in nature.

The invention process is particularly effective in removing heat-stable alkanolamine salts from aqueous alkanolamine solutions used to treat gas streams from tail gas treating units and flue gas purification units, as well as other natural gas and liquid treating units. The invention process is also useful in removing heat-stable alkanolamine salts from aqueous alkanolamine solutions used to treat liquid streams containing acids.

BRIEF DESCRIPTION OF THE DRAWINGS

In the drawings:

FIG. 3 is a schematic of the electrodialysis separator used in Example 1;

FIG. 4 is a schematic of one of the electrodialysis separators used in some of Examples 5 to 16.

DETAILED DESCRIPTION OF THE INVENTION

Figure 1:
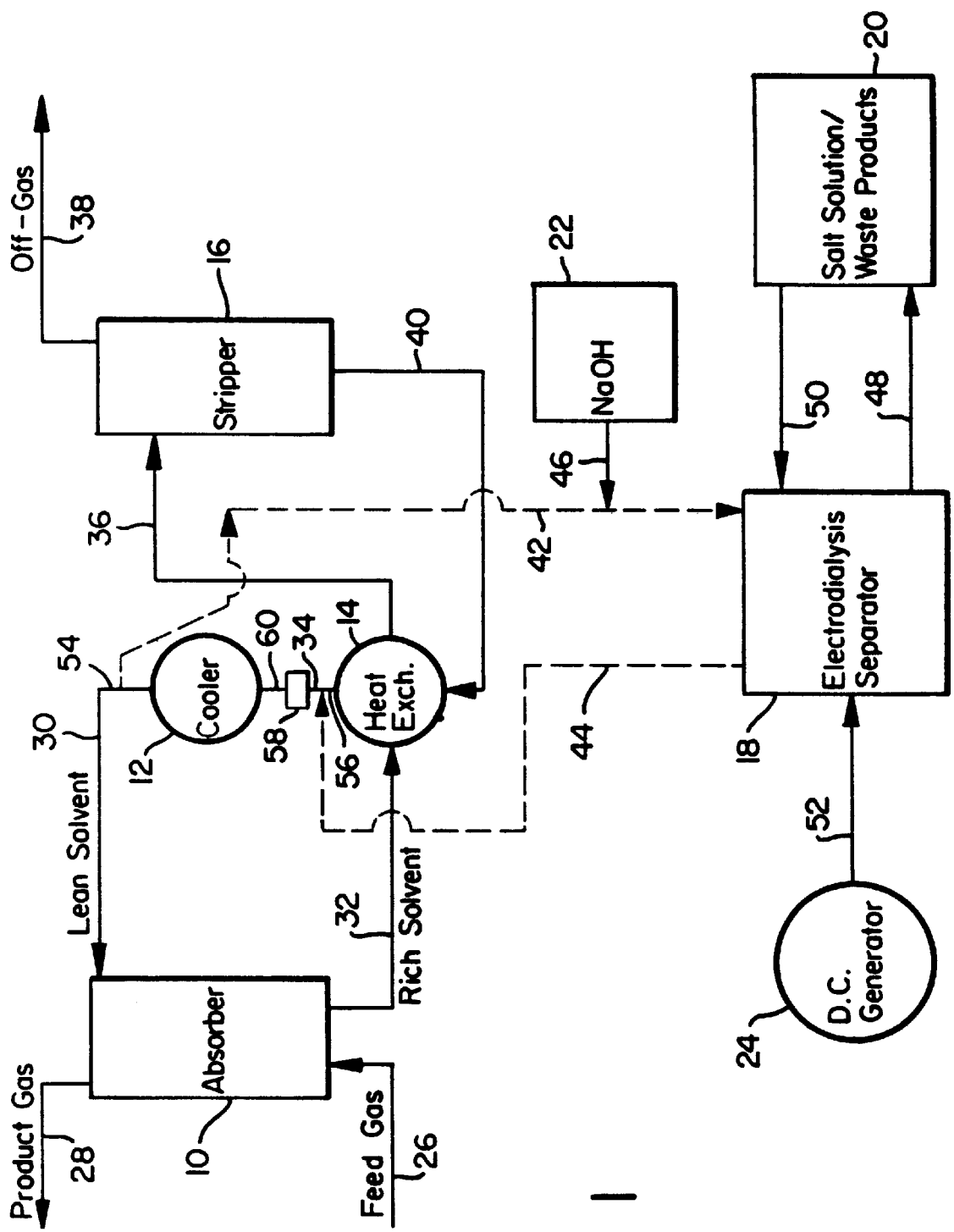
FIG. 1 is a box schematic of the invention scheme incorporated into a typical gas treating operation.

Aqueous solutions of alkanolamines are used as gas treating solvents to remove $CO_2$, and $H_2S$ and other acid gases from various industrial gas streams. The acid gases are usually carbon dioxide and sulfur containing compounds. These alkanolamine solutions can become contaminated with various salts such as sulfates, thiosulfates, chlorides, acetates, formates, oxalates, etc., and also form heat-stable alkanolarine salts with alkanolamine. At concentrations above 5 weight percent, these salts tie up sufficient alkanolamine to significantly reduce the removal efficiency of the acid gases. The invention method provides a technique to remove heat-stable alkanolamine salts and simple salts from aqueous alkanolamines and returns the purified aqueous alkanolamine solution for further use as an absorbent.

The aqueous alkanolamine solutions are in actuality washing liquors.

The aqueous alkanolamine solutions are or can be used to remove acid gases from various gas streams, such as, gas streams from tail gas treating units, gas streams from flue gas purification units, and smelting and power plant stack gases, etc.

The acid gas treating operation of U.S. Pat. Nos. 4,471,138 and 4,184,855 are typical of those in which the process of the invention can be used. The pertinent parts of U.S. Pat. Nos. 4,471,138 and 4,184,855 are incorporated herein by reference. The flue gas purification operation of U.S. Pat. No. 3,554,691 is typical of those in which the process of the invention can be used. The pertinent parts of U.S. Pat. No. 3,554,691 are incorporated herein by reference.

It is often necessary to remove sulfur, which is normally predominantly in the form of hydrogen sulfide, prior to further treatment of the gas stream in order to avoid contamination or poisoning of catalysts often used in further treatments and in order to provide a more environmentally acceptable product.

The heat-stable alkanolamine salts are well-known and described in the art. The portions of U.S. Pat. No. 2,797,188 dealing with the formation, composition, thermal dissociation and the like of the heat-stable alkanolamine salts of the absorbed acids is incorporated herein by reference.

The invention uses an electrodialysis cell with at least one ion exchange membrane to selectively remove ionic species from the aqueous alkanolamine solution. The heat-stable salts of the alkanolamine can be regenerated to alkanolamine and simple salts by the addition of a base, such as, KOH or NaOH. This solution is then passed through an electrodialysis cell with appropriate alternating cationic and anionic ion exchange membranes to remove most of the inorganic cations and organic or inorganic anions.

The process can be carried out in situ on an existing gas treating process using relatively small-scale equipment which can be permanently installed or temporarily brought on location for the purpose of purifying the gas treating solvent. The process can be operated in a semi-batch or continuous mode without the need for cyclic regeneration operation as is required for ion exchange. The primary energy demand is the electromotive force to transport the minor components (contaminant salts) across the membranes plus electrical inefficiencies. In general, the total energy requirement is much less than that required to recover the alkanolamine by distillation.

In general, the invention technique can remove heat-stable alkanolamine salts from all alkanolamines commonly used in gas treating processes. The invention technique is most useful for alkanolamines which are contaminated primarily by heat-stable salts as opposed to other organic non-acid degradation products.

The range and types of alkanolamines useful in the invention method is very broad. However, primary amines, like monoethanolamine (MEA), form significant. non-acid degradation byproducts which may not be as easily removed by the invention technique as in the case with the heat-stable alkanolamine salts. Monoethanolamine has a relatively lower boiling point and is commonly reclaimed by simple atmospheric pressure batch distillation.

Examples of useful primary alkanolamines are ethanolamine, propanolamine, and isopropanolamine.

Examples of useful secondary amines includes diethanolamine, dipropanolamine, diisopropanolamine and hydroxyethoxyethylamine.

Amine alcohols such as benzyl amine can also be used.

The invention method operates best and more economically for the higher boiling point tertiary alkanolamines and/or hindered alkanolamines which are used in the high performance gas treating solvents. Such alkanolamines have much lower rates of degradation under gas treating process conditions than do primary alkanolamines.

Examples of useful higher boiling point tertiary alkanolamines and hindered alkanolamines are triethanolamine, triisopropanolamine, tributanolamine, triisobutanolamine, tripropanolamine, dimethylethanolamine, diethylethanolamine, and methyldiethanolamine. Useful tertiary alkanolamines include those having the formula:

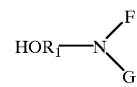

wherein F is $R_2$ or $R_2OH$, G is $R_3$ or $R_3OH$, and each of $R_1$, $R_2$ and $R_3$ is an alkyl or alkylene group (branched or straight chain) having from 2 to 4 carbon atoms.

Examples of useful sterically hindered secondary aminoether alcohols are those of U.S. Pat. No. 4,471,138, namely, the severely sterically hindered secondary aminoether alcohols of the general formula:

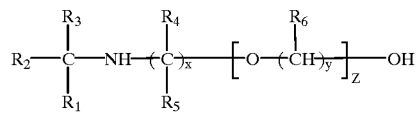

wherein $R_1$ and $R_2$ are each selected from the group consisting of alkyl and hydroxyalkyl radicals, $R_3$, $R_4$, $R_5$ and $R_6$ are each selected from the group consisting of hydrogen, alkyl and hydroxyalkyl radicals, with the proviso that at least one of $R_4$ or $R_5$ bonded to the carbon atom directly bonded to the nitrogen atom is an alkyl or hydroxyalkyl radical when $R_3$ is hydrogen, x and y are each positive integers ranging from 2 to 4 and z is a positive integer ranging from 1 to 4. Examples are 2-(2-tertiarybutylamino)propoxyethanol, 3-(tertiary-butylamino)-1-propanol, 2-(2-isopropylamino) propoxyethanol and tertiarybutylaminoethoxyethanol. The pertinent parts of U.S. Pat. No. 4,471,138 are incorporated herein by reference.

The alkanolamines can also be the poly-alkanolamines (usually 2 to 4 amino groups and 2 to 4 alcohol functions).

Mixtures of alkanolamines can be used.

As mentioned above, the main sources of contaminates in the aqueous alkanolamine solutions are the heat-stable alkanolamine salts.

The electrodialysis cell with ion exchange membranes can be used to treat contaminated alkanolamine solution which was removed from a gas treating unit or can also be used to treat the solution without shutting down the gas treating plant.

In FIG. 1, a typical gas treating plant is shown with a sidestream electrodialysis unit incorporated for conducting the invention process. The conventional gas plant has an absorber, stripper, heat exchanger, cooler, pumps, etc. Feed gas, for example, tail gas containing carbon dioxide, hydrogen sulfide, sulfur dioxide, mercaptans and other acid gases, is fed via line 26 into the bottom of absorber 10. Lean solvent, which is an aqueous alkanolamine solution, is fed via line 30 into the top of absorber 10 so as to provide a countercurrent flow to the feed gas through absorber 10. The lean solvent absorbs substantially most of the acid gases from the counter-flowing feed gas to provide a product gas which exits out of the top of absorber 10. The product gas contains very low levels of acid gases. The lean solvent, after absorbing the acid gases, exits out of the bottom via line 32 of absorber 10 as a rich solvent. The rich solvent contains heat-stable salts of some of the alkanolamine with some of the absorbed acid gases (other than $CO_2$ or $H_2S$). The rich solvent is passed into heat exchanger 14 and sent via line 36 into the top portion of stripper 16. The absorbed gases stripped out of the rich solvent exit out of the top of absorber via line 38. Lean solvent, which is the stripped rich solvent, exits out of the bottom of stripper 16 via line 40. The lean solvent still contains the heat-stable alkanolamine salts. The lean solvent is passed into heat exchanger 14, where there is a heat exchange between the lean solvent and the rich solvent. The lean solvent is passed from heat exchanger 14 to pump 58 via line 34 and then to cooler 12 via line 60. The cooled lean solvent is passed from cooler 12 via line 30 into the top of absorber 10.

Still referring to FIG. 1, to implement the invention, the following are needed: (a) electrodialysis separator 18, (b) caustic addition system 22, (c) waste product solution tank 20 and (d) a source of low voltage dc power, e.g., dc generator 24. This is shown as a schematic representation of the most appropriate (preferred) points in the gas treating process for removal and return of all or part of the alkanolamine, depending upon the pressure, temperature and other operating conditions. Other points in the gas treating process can also be suitable for the removal and return of all or part of the alkanolamine, also depending upon the operating conditions. The entire lean solvent, i.e., the aqueous alkanolamine solution can be taken as a sidestream or the entire lean solvent could be treated depending on the relative sizes. FIG. 1, appropriate valves at 54, i.e., the intersection of lines 30 and 42, and at 56, i.e., the intersection of lines 34 and 44, allow treatment of all or part of the lean solvent from stripper 16 by the invention scheme. The lean solvent diverted via line 42 to electrodialysis separator 18 is first treated with sodium hydroxide (caustic) via line 22 from caustic addition system 22. The added sodium hydroxide converts the heat-stable alkanolamine salts in the lean solvent to alkanolamine and simple salts. In electrodialysis separator 18 the cations and anions of the simpler salts are separated out in the form of a salt solution which is sent via line 48 to waste product solution tank 20 (concentrated solution from sedimentation, etc., is returned from tank 20 to electrodialysis separator 18 via line 50). Purified lean solvent from electrodialysis separator 18 is returned to line 34 via line 44. DC generator 24 supplies the necessary dc power to electrodialysis separator 18 via electrical line 52. The invention process can readily reduce the salt content by 60 to 90 percent, starting with salt concentrations as high as 10 to 15 weight percent. A typical gas plant might have an alkanolamine inventory of 10,000 gallons.

The lean solvent is taken after cooler 12 as this provides the coolest solvent in the cyclic system. The treated solvent is returned to the cyclic system between heat exchanger 14 and pump 58 because this is the lowest pressure point in the cyclic system.

The caustic addition (or other base addition) is required to free the alkanolamine from the salt form and generate simple salts which are then removed in the electrodialysis cell. The caustic (NaOH) can also be added directly to the gas plant. It has been found that with certain commercial aqueous alkanolamine solutions that levels of caustic addition even well below the stoichiometric amount cause the formation of a precipitate which may foul the membranes. The incremental addition of the caustic and/or prefilter will solve any such problem. For example, a filter can be placed in line 42 after intersection with line 46 and before entry into electrodialysis separator 18.

Any suitable base can be used added to the aqueous alkanolamine solution before electrodialysis, but preferably the base is an inorganic base. The inorganic base is preferably $Na_2CO_3$, NaOH or KOH. Suitable inorganic bases include the alkali metal oxides, alkali metal hydroxides, alkali metal carbonates, alkaline earth metal oxides, alkaline earth metal hydroxides and alkaline earth metal carbonates. Specific examples include beryllium hydroxide, lithium hydroxide, calcium hydroxide, sodium carbonate, zinc hydroxide, lithium carbonate, potassium carbonate, sodium oxide, potassium oxide and barium hydroxide. A strong base should normally be used. Mixtures of bases can be used.

The neutralization scheme shown at col. 3, lines 15 to 53, and other associated portions of U.S. Pat. No. 4,389,383 can be used as a pretreatment before the electrodialysis step in the invention process. The pertinent parts of U.S. Pat. No. 4,389,383 are incorporated herein by reference. Neutralization of the contaminated aqueous alkanolamine solution is achieved with at least one base (i.e., alkali metal and/or alkaline earth metal oxide and/or hydroxide and/or carbonate).

Electrodialysis is a membrane process which is used to separate and concentrate ionic species from solutions. This is accomplished by applying a current across a membrane stack containing anionic and cationic membranes. The cationic and anionic membranes are, respectively, permeable to positive and negative ions. The cationic ion exchange members and the anionic ion exchange members are alternatively arranged between the electrodes. The electrodialysis cell can be of the filter press type or unit-cell type.

Any suitable or conventional cationic ion exchange membranes and anionic ion exchange membranes can be used in the electrodialysis cell. If enough is known about the salt content of the contaminated aqueous alkanolamine solution, specific anionic and/or cationic ion exchange membranes can be used.

Examples of suitable cationic ion exchange membrane for use in the electrodialysis cell are those disclosed in U.S. Pat. No. 4,051,002, namely, sulfonic acid group-free cation exchange membranes which are a copolymer of ethylene and an unsaturated carboxylic acid or a salt thereof having an ion exchange capacity of 0.7 to 3 milliequivalent/g (dry resin). The pertinent parts of U.S. Pat. No. 4,051,002 are incorporated herein by reference.

The anion exchange membranes used to prepare the electrodialysis cell are made of polymerization-type or condensation-type polymers, are of a uniform or nonuniform-type and can be weakly basic to strongly basic anion exchange membranes having ion exchange groups, such as, primary, secondary and tertiary amino groups, quaternary ammonium group, quaternary phosphonium group and the like. The anion exchange membrane can have selectivity for particular anions.

Certain ion exchange membranes of RAI Research Corporation are suitable for use in the invention process. All of the membranes of RAI Research Corporation used in the examples are based on a similar concept. Such membranes start with various polymer films as substrates, including polyethylene, Teflon, and polyfluorinated ethylene/propylene. By using radiation grafting techniques, selected organic monomers are grafted as pendant chains to the base linear polymer structure without altering the inert backbone. These grafts are then made into either cationic or anionic forms by reacting with chlorosulfonic acid or triethylamine, respectively. The membranes can be further altered by crosslinking with a difunctional monomer agent, such as, divinyl benzene (preferred). The following membranes can be used in the invention process.

RAIPORE$^R$ R-4010 cationic membrane (of RAI Research Corporation) is a sulfonated graft on a preformed 2 mil fluorinated polymer film. R-4035 anionic membrane is a quaternized vinylbenzylamine graft on a 2 mil preformed fluorinated polymer film. Both such membranes are commercially available from RAI Research Corporation.

Membranes similar to the above, except they are slightly crosslinked with divinyl benzene (about ½ weight percent), can be used. Such membranes, designated 1164-209-A and 1164-209-B, cationic and anionic, respectively, are from RAI Research Corporation. Thicker films (5 to 6 mil) provide additional mechanical strength for use on large scale operations.

The R-5010 cationic and R-5035 anionic membranes of RAI Research Corporation use polyethylene 5 to 6 mil sheets as the substrates. Both the crosslinked (with about ½ weight percent of divinyl benzene) and non-crosslinked versions with varying degrees of grafting can be used.

The preferred membranes are based on Teflon sheets (4 to 6 mil). Both crosslinked and non-crosslinked versions at varying levels of grafting can be used. The preferred membranes (of RAI Research corporation) are prepared as follows:

Anionic Membranes
1. Soak 5 mil sheets of Teflon in a solution of methylene chloride containing 30 vol. percent of vinylbenzylchloride and 0.5 vol. percent of divinyl benzene.
2. Expose to gamma radiation for 1.2 megarads (10,000 rads/hr. for 120 hrs.)
3. Wash in water and dilute caustic to remove unreacted monomers.
4. React with triethylamine activator in water or methylene chloride for 60 to 72 hrs.
5. Wash in water.
6. Measure conductivity: Should be 2 to 4 ohms/cm$^2$ in 0.6N KCl. Permselectivity should be 80 to 90 percent.

Cationic Membranes
1. Soak 5 mil sheets of Teflon in a solution of methylene chloride containing 30 vol. percent of styrene and 0.5 vol. percent of divinyl benzene.
2. Expose to gamma radiation for 1.0 megarads.
3. Wash to remove unreacted monomers.
4. React with 3 percent chlorosulfonic acid in methylene chloride for about 3 hrs.
5. Wash in methanol.
6. Hydrolyze in water.
7. Measure conductivity: Should be 1 to 2 ohms/cm$^2$ in 0.6N KCl. Permselectivity: 80 to 90 percent.

Figure 2:
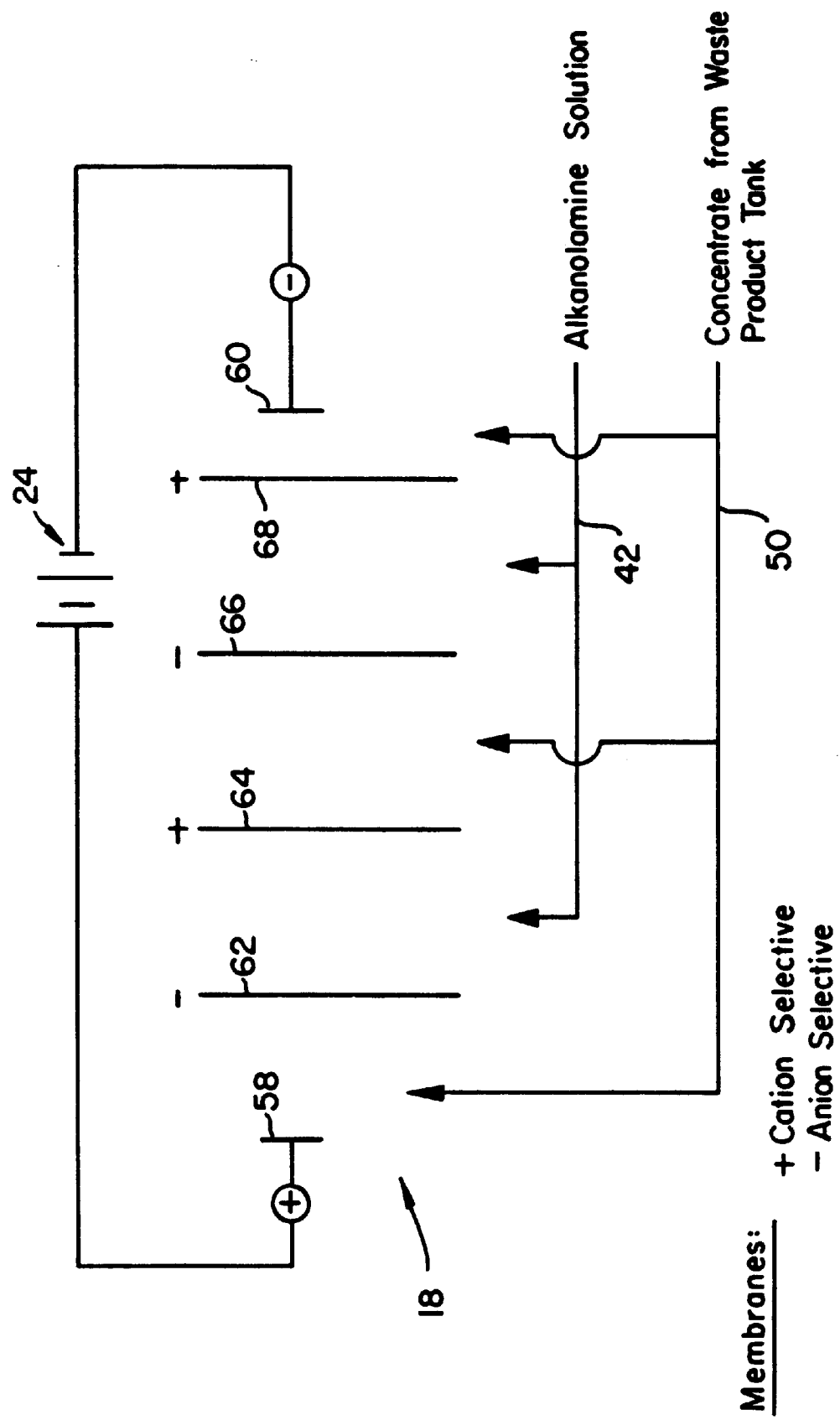
FIG. 2 is a schematic of the electrodialysis separator used in the invention process shown in FIG. 1.

A schematic of electrodialysis separator 18 is shown in FIG. 2. Electrodialysis separator 18 contains postive electrode 58 and negative electrode 60, with alternating anionic membranes 62 and 66 and cationic membranes 64 and 68 therebetween. The alternating membranes form compartments. The alkanolamine solution (from line 42) is circulated continuously through one-half of the compartments and the concentrate (from line 50) from the waste product tank is circulated through the other compartments. The membrane stack has two sets of anionic and cationic membranes arranged alternately. When direct current is applied across the stack, the cations migrate toward negative terminal 60 and anions migrate toward positive terminal 58. After passing through one membrane into an adjacent compartment, the cations encounter an anion selective membrane and the anions encounter a cation selective membrane. The migration is inhibited from continuing into subsequent compartments. Therefore, the stack configuration of alternating anionic and cationic membranes results in the concentration of ionic species in alternating compartments.

The solution stream from which ions are removed is the feed (aqueous alkanolamine solution) and the solution stream into which ions are collected is the concentrate (from the waste product tank).

The electrode compartments usually have separate streams to remove gases generated by the electrode reactions:

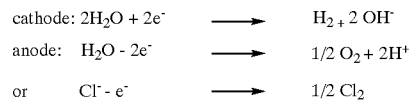

All gases produced must be removed to prevent accumulation within the compartments which may lead to decreased electrical conductivity. The performance of electrodialysis is expressed in terms of current efficiency which can be determined by the following equation:

$$CE = \frac{\text{equivalents of salt transported}}{\text{equivalents of current passed}} = \frac{F(C_i - C_f)Q}{itN}$$

wherein:

$F$ = Faraday's Constant 96,500 $\left[\dfrac{\text{coulombs}}{\text{gram equivalent}}\right]$ $C_i$ = Initial feed concentration $\left[\dfrac{\text{equivalents}}{\text{liter}}\right]$ $C_f$ = Final feed concentration $\left[\dfrac{\text{equivalents}}{\text{liter}}\right]$ $Q$ = Feed stream flow rate (liters/sec)

$i$ = current (amperes)

$t$ = time (seconds)

$N$ = number of membrane pairs

The current efficiency indicates the effective utilization of current passing through the membrane stack for the transfer of ionic species.

The current efficiency may be affected by the extent of membrane fouling which leads to increased electrical and flow resistance. Fouling may be attributed to: (1) increased salt concentration at the membrane surface due to insufficient agitation; and/or (2) a basic environment at the membrane surface when operation occurs above the limiting current density resulting in the splitting of water into H$^+$ and OH$^{31}$ (membrane polarization). Increased pH often results in precipitate formation on the membrane surface.

The extent of fouling can be reduced by: (1) operating at flow rates sufficient to provide agitation at the membrane surface to eliminate solution concentration buildup; and/or (2) periodically reversing the stack polarity.

By way of summary, the invention method purifies aqueous alkanolamine solutions which are used to remove $CO_2$, $H_2S$ and other acid gases from gas streams. During gas treatment these solutions become contaminated with various inorganic and organic salts (such as, sulfate, chlorides, acetates, formates, etc.) and heat-stable salts formed with the alkanolamine itself. These inorganic ionic species, and to a certain extent these organic species, are removed by passing the aqueous solution through an electrodialysis cell. In order to liberate the alkanolamine tied up in the heat-stable alkanolamine salts, a base is added to the solution before it passes through the electrodialysis cell.

It is quite common to use aqueous solutions of alkanolamines as gas treating solvents to remove $CO_2$ and $H_2S$ from various industrial gas streams. These alkanolamine solutions can become contaminated with various inorganic and organic acids such as sulfates, thiosulfate, chlorides, etc., which form heat-stable salts with the alkanolamine. At concentrations above 5 weight percent, the heat-stable alkanolamine salts tie up sufficient alkanolamine to significantly reduce the removal efficiency of the acid gases. The invention provides a technique to remove inorganic and organic salts from aqueous alkanolamines and return the alkanolamine solution for further use as an adsorbent. An electrodialysis cell is used with an ion exchange membrane to selectively remove ionic species from the aqueous solution. The heat-stable salts of alkanolamines can convert to free alkanolamine and simple salts by the addition of a base, such as, KOH, NaOH, or $Na_2CO_3$. This solution is then passed through an electrodialysis cell with the appropriate ion exchange membrane to remove most of the simple salts.

The best mode for the invention process is contemplated to be a combination of the following. First, use enough base to almost fully neutralize the contained heat-stable alkanolamine salts. It is preferred to neutralize to 95 to 98 percent of stoichiometry. This base can be added all at the start of the treatment or spread out with either continuous or incremental additions. Second, since sufficient base to nearly neutralize the heat-stable alkanolamine salts may cause a simple salt precipitate to form, a filtration process should be used to pretreat the solution after base addition, but before electrodialysis. This will shorten the total time needed for electrodialysis and reduce the total energy needed. The dissolved simple salts can then be removed using the electrodialysis cell with ion exchange membranes.

As used herein, all parts, percentages, ratios and proportions are on a weight basis unless otherwise stated herein or otherwise obvious herefrom to one skilled in the art.

EXAMPLE 1

Demonstration Using A Synthetic Feed Solution

The electrodialysis separation of $SO_4=$ from an aqueous solution containing methyldiethanolamine (MDEA) is tested using a laboratory electrodialysis cell. The cell contains five compartments, as shown in FIG. 3. The membranes used are the RAIPORE[R] R-4010 (cationic) and RAIPORE[R] R-4035 (anionic) teflon-based membranes of RAI Research Corportion of 225 Marcus Boulevard, Hauppange, Long Island, N.Y. 11788. The feed solution is introduced to compartments 2 and 4. Compartments 1, 3 and 5 serve as the concentrate compartments. Application of dc current across the cell should result in the migration of $Na^+$ and $SO_4=$ ions from the feed compartments into the adjacent concentrate compartments. Since MDEA is neutral, the migration of MDEA should not be observed.

The feed solution is made up by dissolving 17 gm of anhydrous sodium sulfate and 102 gm of methyldiethanolamine (MDEA) in sufficient distilled water to make 500 ml of solution. This solution is continuously recirculated through the electrodialysis cell during the course of the experiment. Direct current of 1 ampere (46 amperes/ft$^2$) is applied across the cell. The results are as follows:

TABLE I

Electrodialysis of A Synthetic Solution

| Time, minutes | Volt, V | Current, ampere | Conc. of Na$_2$SO$_4$ in feed, wt. % | % Na$_2$SO$_4$ Removed | Conc. of MDEA in feed, wt. % |
|---|---|---|---|---|---|
| 0 | 28.7 | 1.0 | 3.4 | — | 20.36 |
| 60 | 21.4 | 1.0 | 2.5 | 26.5 | 18.54 |
| 100 | 20.9 | 1.0 | 1.7 | 50.0 | 18.84 |
| 170 | 22.6 | 1.0 | 1.1 | 67.6 | — |
| 230 | 26.9 | 1.0 | 0.8 | 76.4 | 18.36 |

In about 4 hours, three-quarters of the salts in the MDEA feed is removed, which demonstrates the definite feasibility of separation by electrodialysis. However, there is a 10 percent loss of MDEA in the feed which could be due to membranes which are too porous. It is expected that with cross-linking, the MDEA loss could be reduced to a minimum.

An experiment similar to the above experiment is run with the same membranes and cell. The results are as follows:

TABLE II

Electrodialysis of A Synthetic Solution

| Time, minutes | Volt, V | Current, ampere | Conc. of Na$_2$SO$_4$ in feed, wt. % | % Na$_2$SO$_4$ Removed | Conc. of MDEA in feed, wt. % |
|---|---|---|---|---|---|
| 0 | 30.4 | 1.0 | 2.3 | — | 18.8 |
| 60 | 22.5 | 1.0 | 1.9 | 17.4 | 18.9 |
| 120 | 22.9 | 1.0 | 1.2 | 47.8 | 19.2 |
| 180 | 27.1 | 1.0 | 0.9 | 60.9 | 19.6 |

In this experiment, the reduction of sodium sulfate in 180 minutes (60.9 percent) is about the same as reported in the first experiment, that is, 67.6 percent in 170 minutes, after one considers the differences in the starting conditions, such as the initial salt concentrations and the voltage applied. However, there is not any observed decrease in the MDEA concentration in the feed.

EXAMPLE 2

Demonstration Using An Actual Field Sample

Contaminated MDEA is obtained from an industrial source. The following analyses are made:

TABLE III

| Component | Weight Percent |
|---|---|
| Free MDEA, determined by titration to pH 4.5 | 25.3 |
| Heat-stable salts of MDEA | 14.6 |
| Inorganic residues (ash) | 1.85 |

To the above solution is added 1 weight percent of solid KOH pellets to increase the solution conductivity. The electrodialysis is then run in the same cell as described in Example 1. The results are as follows:

TABLE IV

| Time, minutes | Voltage, V | Current, ampere | Conc. of Heat Stable Salts in Feed, wt. % | % of Salts Reduction, | Conc. of MDEA in Feed, wt. % |
|---|---|---|---|---|---|
| 0 | 29.8 | 0.22 | 14.31 | 0 | 28.7 |
| 180 | 26.8 | 0.50 | 4.45 | 68.9 | 26.7 |

The electrodialysis of actual contaminated MDEA solution is more complicated, due to its lower electrolytic conductivity and its containing many other salts and hydrocarbons, than synthetic contaminated MDEA solution. However, test run results indicate that a 73 percent reduction in sulfate and a 69 percent reduction in heat-stable salts of MDEA could be achieved in 3 hours.

EXAMPLE 3

KOH Addition

The addition of potassium hydroxide to the spent MDEA solution has two desirable effects: (1) increases solution conductivity, making it easier to pass current through the electrodialysis (ED) cell; and (2) converts the MDEA salt into MDEA. However, adding potassium hydroxide in this example results in precipitate formation, which may lead to process problems.

The following experiments are done to determine the amount of potassium hydroxide that can be added in subsequent experiments:

TABLE V

| KOH, wt. percent | MDEA, wt. percent | MDEA Salt, wt. percent |
|---|---|---|
| 0 | 26.9 | 13.0 |
| 2.5 | 29.9 | 7.9 |
| 5.0 | 34.5 | 1.0 |
| 10.0 | 33.2 | 0 |

The results show that as potassium hydroxide concentration increases, the MDEA salt concentration decreases and the MDEA concentration increases (the drop in MDEA concentration for the 10 percent addition can be attributed to dilution). The criterion one uses to set potassium hydroxide concentration is to increase solution conductivity without a noticeable amount of precipitate formation. A small amount of precipitate is observed at 2.5 weight percent potassium hydroxide. Therefore, the 2 weight percent potassium hydroxide concentration is chosen for some of the following experiments.

EXAMPLE 4

Membrane Developments

Experiments 1 to 3 above are performed with commercially-available RAIPORE$^R$ R-4010 and R-4035 membranes of RAI Research Corporation. In order to improve its selectivity, the coulombic efficiency and better solvent resistance, a series of cross-linked membranes is developed. Cross-linking usually gives better selectivity and hence higher efficiency. Better solvent resistance reduces organic solubility in the membrane and, therefore, reduces any MDEA diffusion across the membrane. The membranes are cross-linked with a difunctional monomer. Some relevant properties of the cross-linked membranes are as follows:

TABLE V

Properties of Improved Membranes

| Sample | Type | Cross-linking | Resistivity, milliohm-in$^2$ | Selectivity percent |
|---|---|---|---|---|
| R4010 | Cationic | None | 46 | 72 |
| R4035 | Anionic | None | 300 | 79 |
| Membrane 1164-209-A | Cationic | Yes | 30 | 81 |
| Membrane 1164-209-B | Anionic | Yes | 200 | 82 |

The above data indicates that the cross-linked membranes have better properties than the uncross-linked as regards the invention process. Higher selectivities mean more simple salts are removed and less alkanolamine is lost.

EXAMPLES 5 to 16

Electrodialysis Cell Configuration

Figure 5:
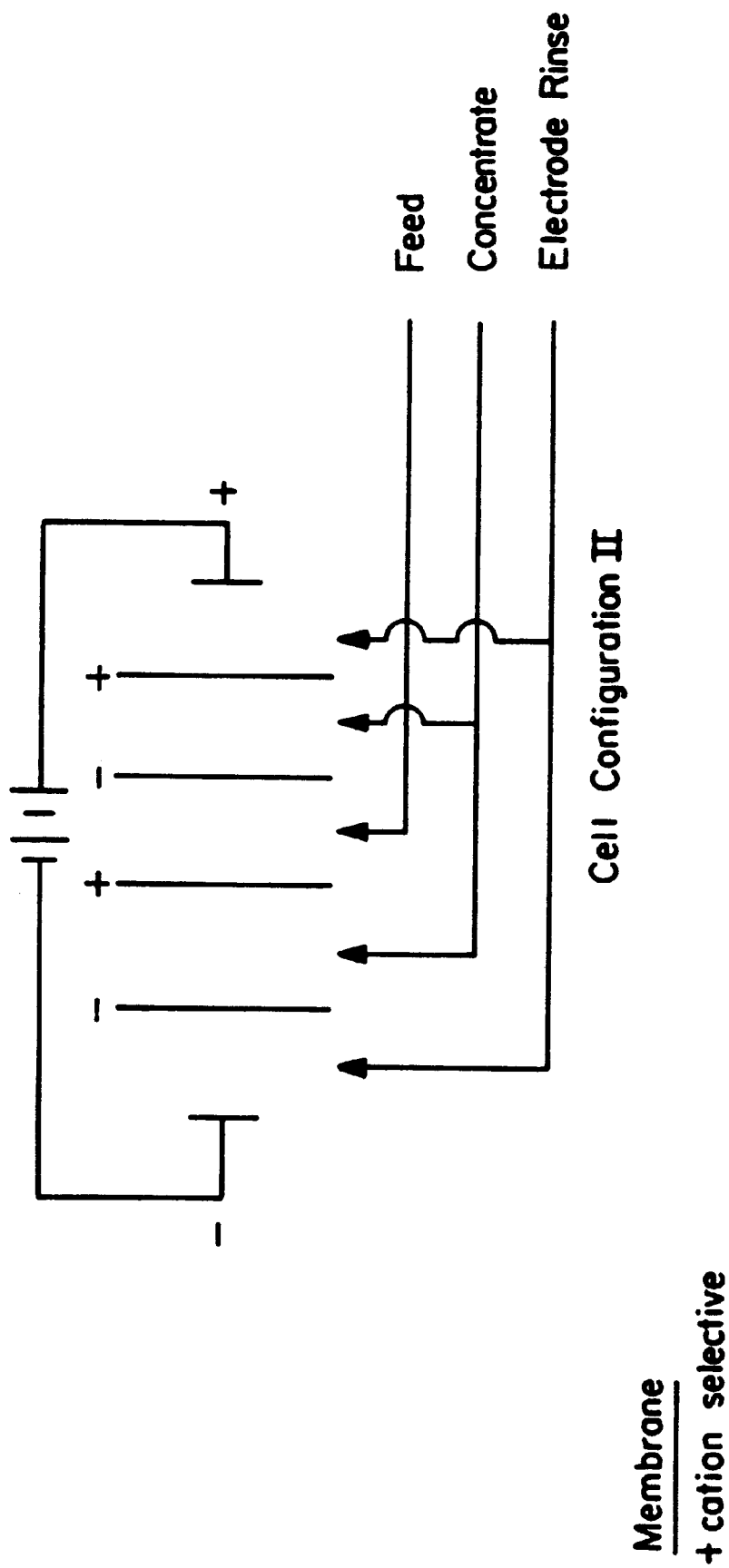
FIG. 5 is a schematic of the other electrodialysis separator used in some of Examples 5 to 16.

As shown in FIGS. 4 and 5, respectively, electrodialysis cell configurations I and II are shown. Intially, the experiments are done using configuration I, since it has two cell pairs and twice the effective membrane area in comparison to configuration II. However, the problem with configuration I is that the concentrate solution is in direct contact with the electrodes. Although this would not have an effect on the separation, it is possible for oxidation of MDEA at the anode and plate out of metallic cations at the cathode to occur. This would make mass balance calculation difficult. Therefore, subsequently the experiments are conducted with cell configuration II where the electrodes are isolated from both feed and concentrate solutions.

For all of the experiments, the concentrate reservoir has an initial condition of 0.5M $Na_2SO_4$. This is to provide good initial solution conductivity. Typical experimental results for cell configuration I are shown in Table VI below for Example 6 and for cell configuration II in Table VII below for Example 9. The volumes of the feed and concentrate reservoirs change over the period of the experiment due to (1) evaporation, (2) removal of samples and (3) leakage of water across the membrane. In cell configuration II there is a third salt solution which is used to flush the electrodes (see the electrode rinse line in FIG. 5). water from this solution can pass through the membrane and increase the volume of the concentrate. In a full-scale unit this would be negligible since the electrode compartment would be a small fraction of the total volume in the electrodialysis (ED) cell.

TABLE VI

Example 6
Membrane: Noncross-linked, R-4010 cationic, R-4035 anionic, 2 mil thick
Cell Configuration: I
KOH Concentration: 2.5%

| Time | Volume | Feed | | | | | |
|---|---|---|---|---|---|---|---|
| | | MDEA | | MDEA Salt | | Inorganic Salt | |
| (hr.) | (ml) | (%) | (g) | (%) | (g) | (%) | (g) |
| 0 | 500 | 29.9 | 162.4 | 7.9 | 42.8 | 6.2 | 33.5 |
| 21 | 460 | 30.1 | 141.8 | 4.3 | 21.6 | 5.4 | 26.8 |
| Removal (%) | | | 20.6 | | 21.2 | | 6.7 |
| | | | 12.7 | | 49.5 | | 20.0 |

TABLE VI-continued

Example 6
Membrane: Noncross-linked, R-4010 cationic, R-4035 anionic, 2 mil thick
Cell Configuration: I
KOH Concentration: 2.5%

Concentrate

| Time (hr.) | Volume (ml) | MDEA (%) | MDEA (g) | MDEA Salt (%) | MDEA Salt (g) | Inorganic Salt (%) | Inorganic Salt (g) |
|---|---|---|---|---|---|---|---|
| 0 | 500 | 0 | 0 | 0 | 0 | — | 35.5 |
| 21 | 480 | 1.9 | 9.7 | 5.0 | 25.7 | — | — |

Operating Parameters

| Time (hr.) | Current (amp) | Voltage (volt) | Temp. (° C.) | pH Feed | pH Concentrate | pH Rinse |
|---|---|---|---|---|---|---|
| 0 | 0.45 | 31.0 | 34 | 9.4 | — | — |
| 1 | 0.45 | 32.1 | 26 | — | — | — |
| 19 | 0.45 | 32.0 | 24 | — | — | — |
| 20 | 0.45 | 30.0 | 25 | — | — | — |
| 21 | 0.45 | 26.9 | 27 | — | — | — |

TABLE VII

Example 9
Membrane: Noncross-linked, R-4010 cationic, R-4035 anionic, 2 mil thick
Cell Configuration: II
KOH Concentration: 2%

Feed

| Time (hr.) | Volume (ml) | MDEA (%) | MDEA (g) | MDEA Salt (%) | MDEA Salt (g) | Inorganic Salt (%) | Inorganic Salt (g) |
|---|---|---|---|---|---|---|---|
| 0 | 250 | 30.4 | 81.8 | 6.6 | 17.8 | 6.5 | 17.6 |
| 24 | 185 | 30.8 | 59.4 | 1.7 | 3.2 | 2.7 | 5.2 |
| Removal (%) | | | 22.4 27.4 | | 14.6 82.0 | | 12.4 70.5 |

Concentrate

| Time (hr.) | Volume (ml) | MDEA (%) | MDEA (g) | MDEA Salt (%) | MDEA Salt (g) | Inorganic Salt (%) | Inorganic Salt (g) |
|---|---|---|---|---|---|---|---|
| 0 | 500 | 0 | 0 | 0 | 0 | 6.9 | 36.9 |
| 24 | 720 | 2.5 | 19.7 | 2.7 | 20.9 | 10.5 | 82.3 |

Operating Parameters

| Time (hr.) | Current (amp) | Voltage (volt) | Temp. (° C.) | pH Feed | pH Concentrate | pH Rinse |
|---|---|---|---|---|---|---|
| 0 | 0.6 | 30.4 | 22 | 9.2 | 8.7 | 8.7 |
| 3 | 0.6 | 26.3 | 29 | 9.8 | 8.8 | 8.3 |
| 6 | 0.6 | 26.3 | 30 | 9.1 | 8.7 | 8.0 |
| 22.5 | 0.6 | 25.9 | 26 | 9.5 | 8.8 | 9.1 |
| 24 | 0.6 | 27.5 | 25 | 9.5 | 8.8 | 8.2 |

TABLE VIII

Summary of Experimental Results

| Membrane | Current (amp) | Cell Configuration | % KOH | Time (hr.) | % Removal From Feed MDEA | % Removal From Feed MDEA Salt | % Removal From Feed Simple Salt |
|---|---|---|---|---|---|---|---|
| A 5 | 0.3 | I | 0 | 9 | 5.6 | 16.3 | — |
| A 6 | 0.45 | I | 2.5 | 21 | 12.7 | 49.5 | 20.0 |
| A 7 | 0.5 | I | 5.0 | 24 | 9.8 | 45.5 | 60.1 |
| A 8 | 0.5 | I | 10.0 | 22 | 11.9 | — | 53.3 |
| A 9 | 0.6 | II | 2.0 | 24 | 27.4 | 82.0 | 70.5 |
| A 10 | 0.6 | II | 2.0 | 24 | 29.6 | 76.5 | 73.9 |
| B 11 | 0.6 | I | 2.0 | 18 | 11.2 | 60.9 | 55.6 |
| B 12 | 0.6 | II | 2.0 | 9.5 | 6.2 | 51.9 | 38.4 |
| B 13 | 0.6 | II | 2.0 | 9.3 | 5.3 | 62.0 | 33.6 |
| A 14 | 0.6 | I | 2.0 | 48 | 45.5 | 100.0 | 76.6 |
| A 15 | 0.6 | I | 2.0 | 48 | 51.8 | 100.0 | 93.0 |
| B 16 | 0.5 | II | 2.0 | 48 | 11.1 | 82.7 | 62.6 |

Footnotes:
The numbers following A or B are the example numbers.
A - RAIPORE ® R-4010 cationic and R-4035 anionic membranes; noncross-linked; 2 mil thick.
B - 1164-209A Cationic and 1164-209-B anionic membranes; cross-linked; 2 mil thick.

TABLE IX

Example 16
Membrane: Cross-linked, 1164-209A cationic and
1164-209-B anionic membranes; 2 mil thick
Cell Configuration: II
KOH Concentration: 2%

Feed

| Time (hr.) | Volume (ml) | MDEA (%) | MDEA (g) | MDEA Salt (%) | MDEA Salt (g) | Inorganic Salt (%) | Inorganic Salt (g) |
|---|---|---|---|---|---|---|---|
| 0 | 500 | 29.6 | 160.9 | 8.6 | 46.7 | 6.3 | 34.2 |
| 48 | 395 | 34.7 | 152.9 | 2.0 | 8.1 | 3.2 | 12.8 |
| Removal (%) | | | 17.8 11.1 | | 38.6 82.7 | | 21.4 62.6 |

Concentrate

| Time (hr.) | Volume (ml) | MDEA (%) | MDEA (g) | MDEA Salt (%) | MDEA Salt (g) | Inorganic Salt (%) | Inorganic Salt (g) |
|---|---|---|---|---|---|---|---|
| 0 | 250 | 0 | 0 | 0 | 0 | 6.9 | 18.5 |
| 48 | 595 | 1.8 | 12.0 | 5.7 | 38.4 | 13.3 | 89.6 |

Operating Parameters

| Time (hr.) | Current (amp) | Voltage (volt) | Temp. (° C.) | pH Feed | pH Concentrate | pH Rinse |
|---|---|---|---|---|---|---|
| 0 | 0.5 | 22.8 | 20 | 9.6 | 8.3 | 8.3 |
| 6.5 | 0.5 | 18.3 | 24 | — | — | — |
| 24 | 0.5 | 17.6 | 25 | 9.8 | 8.8 | 6.3 |
| 30.5 | 0.5 | 18.5 | 24 | — | — | — |
| 48 | 0.5 | 18.6 | 29 | 9.8 | 8.6 | — |

In Table VIII the experimental results are shown. The objective is to remove all of the salts from the feed and regenerate all of the MDEA with no losses. The data shows that the noncross-linked membranes have higher losses of MDEA from the feed. Increasing the weight percent of KOH tends to improve the separation as expected (however, this conclusion is based upon limited data).

EXAMPLES 17 TO 24

The objective is to improve selectivity and possibly lower the resistance of the membrane. Higher selectivity would allow less alkanolamine to cross the membrane into the concentrate stream. A lower resistance membrane would yield lower total power consumption to effect a given separation.

These examples are shown in Table X. The data show the effect of varying the degree of crosslinking and the percent grafting of the membrane on the separation. Examples 17 to 19 use membranes based on 5 mil thick polyethylene and are variations of RAIPORE$^R$ R-5010 cationic and R-5035 anionic membranes available from RAI Research Corporation. Examples 20–24 use membranes based on 5 mil thick Teflon membranes. All examples in Table X are carried out with 2 percent KOH addition, 0.6 amps, for 24 hours using cell configuration II as shown in FIG. 5.

The best results are obtained in examples 22 to 24 where the MDEA loss across the membrane is smallest. The preferred membranes are those used in Example 23.

TABLE X

| Example | Membrane | Crosslink with Radiation or % DVB, Cationic/Anionic | % Graft, Cationic/Anionic | % Removal from Feed MDEA | MDEA Salt | Simple Salt |
|---|---|---|---|---|---|---|
| 17 | C | 0/0 | 0/0 | 13 | 70 | 48 |
| 18 | C | 15 MR/10 MR | 28.6/31 | 20 | 69 | 44 |
| 19 | C | 45 MR/10 MR | 28.6/31 | 20 | 68 | 47 |
| 20 | D | 1.5/0 | 21.4/18 | 7 | 59 | 32 |
| 21 | D | 1.5/0.5 | 21.4/17 | 8 | 74 | 50 |
| 22 | D | 0.5/0.5 | 17.4/12.2 | 6 | 59 | 47 |
| 23 | D | 0.5/0.5 | 17.4/11.6 | 5 | 77 | 49 |
| 24 | D | 0.5/0.5 | 17.4/9.2 | 7 | 60 | 48 |

Notes:
C- Variations of polyethylene based RAIPORE ® R-5010 cationic and R-5035 anionic membranes; 5 mil thick.
D - Variations of Teflon based cationic and anionic membranes; 5 mil thick.

EXAMPLES 25 TO 27

Data from a pilot scale unit, as obtained from the field, is shown in Table XI.

50% sodium hydroxide is added to the plant alkanolamine solvent to liberate most of the alkanolamine. Then this solvent is processed in 50 gallon batches in the pilot unit. Data in Table XI shows a 90 percent ash removal with about 85 percent amine recovery.

TABLE XI

Field Data on the Pilot Electrodialysis Unit
Initial

| Example | Time Hrs. | Volume Gallons | Amine Wt. % | HSS Wt. % | Ash Wt. % | % Ash Removal | % Amine Recovery |
|---|---|---|---|---|---|---|---|
| 25 | 5.3 | 50 | 17.6 | 1.8 | 6.8 | 97 | 83 |
| 26 | 4.5 | 50 | 18.5 | 2.1 | 6.2 | 92 | 84 |
| 27 | 7.2 | 51 | 18.6 | 4.2 | 6.5 | 86 | 88 |

Ash removal is a measure of the reduction of the simple salts. The membranes used for this example are the preferred membranes and are the same composition as used in Example 23.

What is claimed is:

1. In a method for removing carbon dioxide and/or hydrogen sulfide, plus other acid gases, from a gas stream by passing the gas stream through an aqueous alkanolamine solution such that carbon dioxide and/or hydrogen sulfide, plus other acid gases are removed from the gas stream, and heat-stable alkanolamine salts are formed in the aqueous alkanolamine solution by the reaction of alkanolamine and said other acid gases, and stripping substantially all of said acid gases from the aqueous alkanolamine solution, the improvement comprising:
   (a) treating at least part of the stripped aqueous alkanolamine solution with a base whereby about 95 to about 98% of the alkanolamine salt stoichiometry is neutralized and converted into alkanolamine and at least one simple salt;
   (b) removing precipitate which may be formed; and
   (c) electrodialyzing the solution treated in step (a) in an electrodialysis cell containing at least two at least partially cross-linked, polymeric ion exchange membranes to remove at least about 74% by weight of the salt from the solution by selectively passing ions of the salt across the membranes while retaining alkanolamine in the solution passing through the cell;

whereby partially or completely purified alkanolamine in aqueous solution form is obtained, wherein the amount of the partially or completely purified alkanolamine is recovered in an amount greater than about 92% by weight of the total amount of alkanolamine treated.

2. In a process for removing acid gases from a gas stream by scrubbing the gas stream with an aqueous alkanolamine solution thereby forming a rich alkanolamine solution containing absorbed acid gases and at least one heat stable salt, and stripping the rich solution of absorbed acid gases thereby providing a lean aqueous alkanolamine solution contaminated with said heat stable salt, the improvement which comprises:
   (a) treating at least part of the lean aqueous alkanolamine solution with a base in an amount sufficient to convert about 95 to about 98% based on stoichiometry of the heat stable salt to alkanolamine and at least one simple salt;
   (b) removing precipitate which may be formed; and
   (c) electrodialyzing the lean solution treated in step (a) in an electrodialysis cell containing at least two at least partially cross-linked, polymeric ion exchange membranes to remove at least about 74% by weight of the salt from the solution by selectively passing ions of the salt across the membranes while retaining alkanolamine in the solution passing through the cell;

whereby partially or completely purified alkanolamine in aqueous solution is obtained, wherein the amount of the partially or completely purified alkanolamine is recovered in an amount greater than about 92% by weight of the total amount of alkanolamine treated.

3. The method of claim 2 wherein said acid gases are carbon dioxide, hydrogen sulfide and mercaptans.

4. The method of claim 2 wherein most to substantially all of the alkanolamine is retained in the solution.

5. The method as claimed in claim 2 wherein in step (a), enough base is used to substantially neutralize the heat-stable salts.

6. The method as claimed in claim 2 wherein the base is KOH, NaOH, or $Na_2CO_3$.

7. The method as claimed in claim 2 wherein the base-treated aqueous alkanolamine solution from step (a) is filtered before it is electrodialyzed in step (b).

8. The method as claimed in claim 2 wherein the at least two ion exchange membranes are a cationic ion exchange membrane and an anionic ion exchange membrane in series.

9. The method as claimed in claim 2 wherein the at least two ion exchange membranes are a series of at least two sets of an alternating sequence of cationic ion exchange membrane and anionic ion exchange membrane.

10. The method as claimed in claim 9 wherein each of the cationic ion exchange membranes is a Teflon sheet having a thickness of about 4 to 6 mils, grafted with about 25 to 35 volume percent of styrene, crosslinked with about 0.3 to 0.5 volume percent of divinyl benzene and activated with chlorosulfonic acid, and each of the anionic ion exchange membrane is a Teflon sheet having a thickness of about 4 to 6 mils, grafted with about 25 to 35 volume percent of vinylbenzylchloride, crosslinked with about 0.3 to 0.5 volume percent of dinvinyl benzene and activated triethylamine.

11. The method as claimed in claim 2 wherein the alkanolamine is triethanolamine, methyldiethanolamine, or diethanolamine.

12. The method as claimed in claim 3 wherein in step (a), enough base is used to almost fully neutralize the heat-stable salts.

13. The method as claimed in claim 3 wherein the base is KOH, NaOH or $Na_2CO_3$.

14. The method as claimed in claim 3 wherein the base-treated aqueous alkanolamine solution from step (a) is filtered before it is electrodialyzed in step (b).

15. The method as claimed in claim 3 wherein the at least two ion exchange membranes are a cationic ion exchange membrane and an anionic ion exchange membrane.

16. The method as claimed in claim 3 wherein the at least two ion exchange membranes are a series of at least two sets of an alterating sequence of cationic ion exchange membrane and anionic ion exchange membrane.

17. The method as claimed in claim 3 wherein each of the cationic ion exchange membranes is a Teflon sheet having a thickness of about 4 to 6 mils, grafted with about 25 to 35 volume percent of styrene, crosslinked with about 0.3 to 0.5 volume percent of divinylbenzene and activated with chlorosulfonic acid, and each of the anionic ion exchange membrane is a Teflon sheet having a thickness of about 4 to 6 mils, grafted with about 25 to 35 volume percent of vinylbenzylchloride, crosslinked with about 0.3 to 0.5 volume percent of divinyl benzene and activated triethylamine.

18. The method as claimed in claim 1 wherein a gas stream containing carbon dioxide and/or hydrogen sulfide, plus other acid gases, is passed through the purified aqueous alkanolamine solution obtained from step (b), the carbon dioxide and/or hydrogen sulfide, plus other acid gases, thereby being removed from the gaseous stream, and heat-stable alkanolamine salts thereby being formed in the aqueous alkanolamine solution, and wherein the reused aqueous alkanolamine solution is treated with a base and is then subjected to electrodialysis in an electrodialysis cell containing at least two ion exchange membranes, whereby purified alkanolamine in aqueous solution form is obtained.

19. The method as claimed in claim 1 wherein a gas stream containing carbon dioxide and hydrogen sulfide is passed through the purified aqueous alkanolamine solution obtained from step (b), the carbon dioxide and hydrogen sulfide, plus other acid gases, thereby being removed from the gaseous stream, and heat-stable alkanolamine salts thereby being formed in the aqueous alkanolamine solution.

20. The method as claimed in claim 2 wherein the removed gases include carbon dioxide and/or hydrogen sulfide.

21. The method as claimed in claim 2 wherein most to substantially all of the alkanolamine is retained in the solution.

* * * * *